(12) United States Patent
Baas, III

(10) Patent No.: US 10,730,772 B1
(45) Date of Patent: Aug. 4, 2020

(54) SCAT TRAP FILTER AND AERATOR SYSTEM

(71) Applicant: SCAT Enterprises LLC, Chichester, NH (US)

(72) Inventor: John C. Baas, III, Chichester, NH (US)

(73) Assignee: SCAT Enterprises LLC, Chichester, NH (US)

( * ) Notice: Subject to any disclaimer, the term of this patent is extended or adjusted under 35 U.S.C. 154(b) by 0 days.

(21) Appl. No.: 16/667,153

(22) Filed: Oct. 29, 2019

Related U.S. Application Data

(60) Provisional application No. 62/752,102, filed on Oct. 29, 2018.

(51) Int. Cl.
| | |
|---|---|
| *C02F 3/28* | (2006.01) |
| *C02F 1/00* | (2006.01) |
| *C02F 3/20* | (2006.01) |
| *C02F 3/12* | (2006.01) |
| *B01D 29/15* | (2006.01) |
| *B01D 29/64* | (2006.01) |
| *C02F 3/30* | (2006.01) |

(52) U.S. Cl.
CPC ............ *C02F 3/288* (2013.01); *B01D 29/15* (2013.01); *B01D 29/6484* (2013.01); *C02F 1/001* (2013.01); *C02F 3/1278* (2013.01); *C02F 3/20* (2013.01); *C02F 3/30* (2013.01); *C02F 2203/006* (2013.01); *C02F 2303/16* (2013.01)

(58) Field of Classification Search
CPC .. C02F 3/288; C02F 1/001; C02F 3/20; C02F 3/1278; C02F 3/30; C02F 2303/16; C02F 2203/006; B01D 29/6484; B01D 29/15

USPC ......... 210/620, 221.1, 221.2, 238, 259, 470, 210/532.2

See application file for complete search history.

(56) References Cited

U.S. PATENT DOCUMENTS

| | | | | |
|---|---|---|---|---|
| 5,427,629 | A | * | 6/1995 | Tanzilli ............. H01L 31/02168 136/206 |
| 6,231,762 | B1 | | 5/2001 | Marshall, III |
| 6,231,764 | B1 | | 5/2001 | Wilkins |
| 6,319,403 | B1 | | 11/2001 | Meyers |

(Continued)

OTHER PUBLICATIONS

United States Environmental Protection Agency, Decentralized Systems Technology Fact Sheet; Septic Tank Effluent Screens, 4 pages.

*Primary Examiner* — Fred Prince
(74) *Attorney, Agent, or Firm* — Maine Cernota & Rardin

(57) ABSTRACT

A system to treat effluent in a septic tank includes filter sections having kerfs. A strainer removes solid debris from the filter for removal without allowing the solid debris to pass. An aerator includes an eight to twelve inch diameter pipe 4 to 6 feet tall matching tank invert height. The aerator has bottom inlet holes, each with an elbow on the outside with a vertical standpipe taking effluent from the clear zone, sending it through the aerator. Air inlet piping is attached to a "T" shaped air diffuser producing bubbles traveling upward through plastic media. Aerator height is field adjusted to approximately 2 inches below static water level. Holes in the upper sidewalls just below the top let air bubbles out sideways. At its top, the aerator has a slotted, sliding, anti-turbulation collar adjusted to be one to two inches above the static water level.

20 Claims, 18 Drawing Sheets

FIRST FILTER EMBODIMENT OVERVIEW

(56) References Cited

U.S. PATENT DOCUMENTS

| | | | |
|---|---|---|---|
| 6,338,797 B1 * | 1/2002 | Nurse, Jr. | B01D 29/35 |
| | | | 210/238 |
| 6,447,680 B1 * | 9/2002 | Richard | B01D 29/15 |
| | | | 210/532.2 |
| 2003/0085182 A1 | 5/2003 | Wilkins et al. | |
| 2009/0223891 A1 * | 9/2009 | Gauthier | B01D 61/18 |
| | | | 210/605 |
| 2015/0210577 A1 * | 7/2015 | Pardo | C02F 3/006 |
| | | | 210/603 |

* cited by examiner

FILTER ENVIRONMENT

FIRST FILTER EMBODIMENT OVERVIEW

FILTER EMBODIMENT UPPER FILTER SECTION COMPONENT (215) DETAILS

FILTER EMBODIMENT CENTER (220) AND LOWER (225) COMPONENT DETAILS

500

210 STREET ELBOW

230 BOTTOM CAP & STRAINER

FILTER EMBODIMENT COMPONENT DETAILS

SECOND FILTER EMBODIMENT OVERVIEW

FILTER EMBODIMENT UPPER FILTER SECTION COMPONENT (615) DETAILS

800

805
ATTACHMENT
STEEL STRAPPING
CLIPS

805
STEEL STRAPPING
CLIPS

810
PIPE SPACER

FILTER EMBODIMENT ATTACHMENT - SPACER COMPONENT (610) DETAILS

FILTER EMBODIMENT OUTLET (605) AND CENTER (620) COMPONENT DETAILS

FILTER EMBODIMENT LOWER SECTION (625) COMPONENT DETAILS

1100

1105 CLEANING STRAINER VIEW ONE

PIPEFITTING FOR LIFTING

1110 CLEANING STRAINER VIEW TWO

EMBODIMENT COMPONENT DETAILS

FILTER EMBODIMENT METHOD FLOW CHART

AERATOR ENVIRONMENT

1500

1505 TOP PLATE SIDE VIEW CROSS SECTION

UNOBSTRUCTED

1/4" THICK FLAT PVC PLATE OPEN TO PERMIT FREE FLOW WITHOUT CLOGGING

1510 TOP PLATE TOP VIEW

←AIR→

1515 BOTTOM PLATE SIDE VIEW

1/4" THICK FLAT (NON-OBSTRUCTING) PVC OPEN PLATE TO PERMIT FREE FLOW WITHOUT CLOGGING

AERATOR EMBODIMENT COMPONENT DETAILS

AERATOR EMBODIMENT WITH ANTI-TURBULATION COLLAR

1700

1705 SLIDING ANTI-
TURBULATION COLLAR

AERATOR EMBODIMENT SLIDING ANTI-TURBULATION COLLAR COMPONENT DETAILS

AERATOR EMBODIMENT METHOD FLOW CHART

SCAT TRAP FILTER AND AERATOR SYSTEM

RELATED APPLICATIONS

This application claims the benefit of U.S. Provisional Application No. 62/752,102, filed Oct. 29, 2018. This application is herein incorporated by reference in its entirety for all purposes.

FIELD OF THE INVENTION

The invention relates to filters and aerators, and more particularly, to an in-tank septic tank effluent strainer, filter, and aerator device, system, and method.

BACKGROUND OF THE INVENTION

Many homes, parks, and commercial developments throughout the United States lack municipal sewer services due to their remote locations, or owner preference. Instead, such locations utilize on-site waste and septic tank systems for their sewage disposal needs. Septic tanks include at least one entry port to accept sewage waste from a nearby home or commercial structure, and at least one effluent port. The septic tank typically holds an upper scum layer, an intermediate liquid effluent layer called the clear zone, and a lower sludge layer. Grease, fats, oils, and floatables are typically found in the scum layer. The sludge layer is where most of the solid waste products collect and biologically decompose, with the effluent being discharged into a leach field. However, solid debris can impair normal operation, leading to the use of filters to block them.

While some septic tank filters may keep plastics, gloves, syringes, feminine products and nonflushable items from entering, clogging, and disabling sewage pump systems, they can ultimately cause more problems. Using a cartridge-type effluent filter can cause an above-normal rise in the static water level in the septic tank, especially when they are ready for cleaning. Cartridge-type effluent filters inserted in the tank outlet T baffle will capture these items until the cartridge is pulled out for cleaning, at which point, these items will rise up the outlet T-baffle with the cartridge and pass into the pump chamber with potentially disastrous results. There is no way to stop these items from surging into the pump chamber or leach field from an over-full septic tank. Just one plastic item or syringe can ruin a sewage ejector pump.

All references, including publications, patent applications, and patents, cited herein are hereby incorporated by reference to the same extent as if each reference were individually and specifically indicated to be incorporated by reference and were set forth in its entirety herein.

What is needed are filter and aerator devices, systems, and methods to prevent degradation and damage from solid debris such as syringes, and enhance decomposition, respectively, in septic systems.

SUMMARY OF THE INVENTION

An embodiment provides a septic tank effluent treatment system comprising a filter comprising an upper section (215); a center section (220); a lower section (225) connecting the upper section and the lower section; attachments (805) for locating the filter; a spacer (810) to align the upper section; and a liftable cleaning strainer (230, 1105, 1110); wherein the strainer removes solid debris from the filter for removal without allowing the solid debris to pass; wherein the upper and lower sections comprise kerf slots; and wherein the center section connects to a tank baffle. Embodiments further comprise an aerator (1310, 1605) comprising a large-diameter-to-length ratio aerator pipe; inlet piping to the aerator pipe; an air-diffuser (1405) within the aerator pipe; treatment media within the aerator pipe; and an anti-turbulation collar (1705). In other embodiments dimensions of the filter comprise an 8 inch diameter of the liftable cleaning strainer slide cap basket, 4 inches high with ⅛ inch kerf cut spacing for cleaning; a ½ inch diameter strainer lifting pipefitting; the lower section comprising an upper 2 inch land section, a 12 inch slots section, a 1 inch land, a 12 inch slots section, and a 2 lower inch land section (625); and a 4" diameter of the tank baffle. In subsequent embodiments dimensions of the aerator comprise a diameter of the aerator pipe of 8 to 12 inches; a length of the aerator pipe of 4 to 6 feet; ¾ inch diameter inlet holes in the aerator pipe; a ½ inch diameter fitting of the air diffuser; and an 8 inch length of the anti-turbulation collar. For additional embodiments a cap of the filter extends above a static liquid level the filter extending down to a depth of 4 feet. In another embodiment the filter comprises an outlet end a T fitting of the center section connected to a street 90 elbow or a standard elbow affixed to a lower end of an existing the T baffle. For a following embodiment the filter comprises top and bottom ends fitted with perforated caps screwed to slotted pipe ends, wherein the top perforated cap extends above a surface liquid level just enough so that it is removable to clean an inside of the filter without removing the filter. In subsequent embodiments the liftable cleaning strainer (230, 1105, 1110) of the filter comprises a U-shaped, slotted plastic mesh with ¼ inch slots or holes throughout; wherein the liftable cleaning strainer is 2 inches wider than a diameter of the filter; and a rim of the liftable cleaning strainer extends upward from a bottom surface of the liftable cleaning strainer for 4 inches. In additional embodiments the upper filter section (215, 615) comprises a removable slit-top cap comprising a lift handle. In ensuing embodiments a surface area of holes comprising the diffuser of the aerator are less than or equal to 80% of an inside area of a vertical air supply pipe. In included embodiments the treatment media of the aerator comprises fixed-film plastic media upon which facultative aerobic bacteria grow. In yet further embodiments the treatment media of the aerator comprises a PVC plastic mesh fabric with 2 inch diameter holes cut into it at ½ inch intervals, the media extending down from a top of the aerator pipe to the air diffuser, and extending to within 1 or 2 inches of the top plate of the aerator. In related embodiments the anti-turbulation collar (1705, 1805) of the aerator is slidable and comprises an open flex seam and saw kerf slots. For further embodiments the ends of the aerator are unobstructed.

Another embodiment provides a septic tank effluent treatment method comprising providing a filter comprising about a four square-foot surface area and an external cleaning basket (1205); connecting the filter to a septic tank T-baffle (1210); operating a septic system (1215); clearing the filter outside by raising the cleaning basket and emptying the basket (1220); lowering the cleaning basket (1225); and continuing operation of the septic system and repeating filter clearing as necessary (1230). Yet further embodiments comprise providing an aerator (1805) comprising an aerator pipe, inlet piping to the aerator pipe, an air-diffuser (1405) within the aerator pipe, treatment media within the aerator pipe, and an anti-turbulation collar (1705); installing the aerator in the septic tank at an outlet end and connecting to an air supply (1810); height-adjusting the anti-turbulation collar (1815);

supplying air (1820); and operating the septic system (1825). For more embodiments, raising of the cleaning basket of the filter comprises lifting by a ½ inch diameter pipe having a length reaching a bottom of the filter and affixed to a female pipefitting on an inside edge of the cleaning basket. In continued embodiments the step of installing the aerator comprises adjusting the anti-turbulation collar to the liquid level.

A yet further embodiment provides a septic tank effluent treatment device comprising a filter comprising an upper section (215); a center section (220); a lower section (225) connecting the upper section and the lower section; attachments (805) for locating the filter; a spacer (810) to align the upper section; and a liftable cleaning strainer (230, 1105, 1110). Additional embodiments further comprise an aerator (1310, 1605) comprising a large-diameter-to-length ratio aerator pipe; inlet piping to the aerator pipe; an air-diffuser (1405) within the aerator pipe; treatment media within the aerator pipe; and an anti-turbulation collar (1705).

An embodiment provides a filter device, system, and method comprising an upper section (215); a center section (220); a lower section (225); attachments (805); a spacer (810); and a liftable strainer (230); wherein the strainer removes solid debris from the filter for removal without allowing the solid debris to pass; wherein the upper and lower sections comprise kerf slots; wherein the center section connects to an existing tank baffle; steps comprise providing the filter comprising about a four square-foot surface area and external cleaning basket (1205); connecting the filter to a septic tank T-baffle (1210); operating a septic system (1215); clearing the filter outside by raising the cleaning basket and emptying the basket (1220); lowering the cleaning basket (1225); and continuing operation of the septic system and repeating filter clearing as necessary (1230).

Another embodiment provides an aerator device, system, and method comprising a large-diameter aerator pipe; inlet piping; an air-diffuser; treatment media; and an anti-turbulation collar (1100); steps comprise providing the aerator (1805); installing the aerator in a tank at an outlet end and connecting to an air supply (1810); height-adjusting the anti-turbulation collar (1815); supplying air (1820); and operating the septic system (1825).

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter. The invention is susceptible of many embodiments. What follows is illustrative, but not exhaustive, of the scope of the invention.

DETAILED DESCRIPTION

Filter

Figure 1:
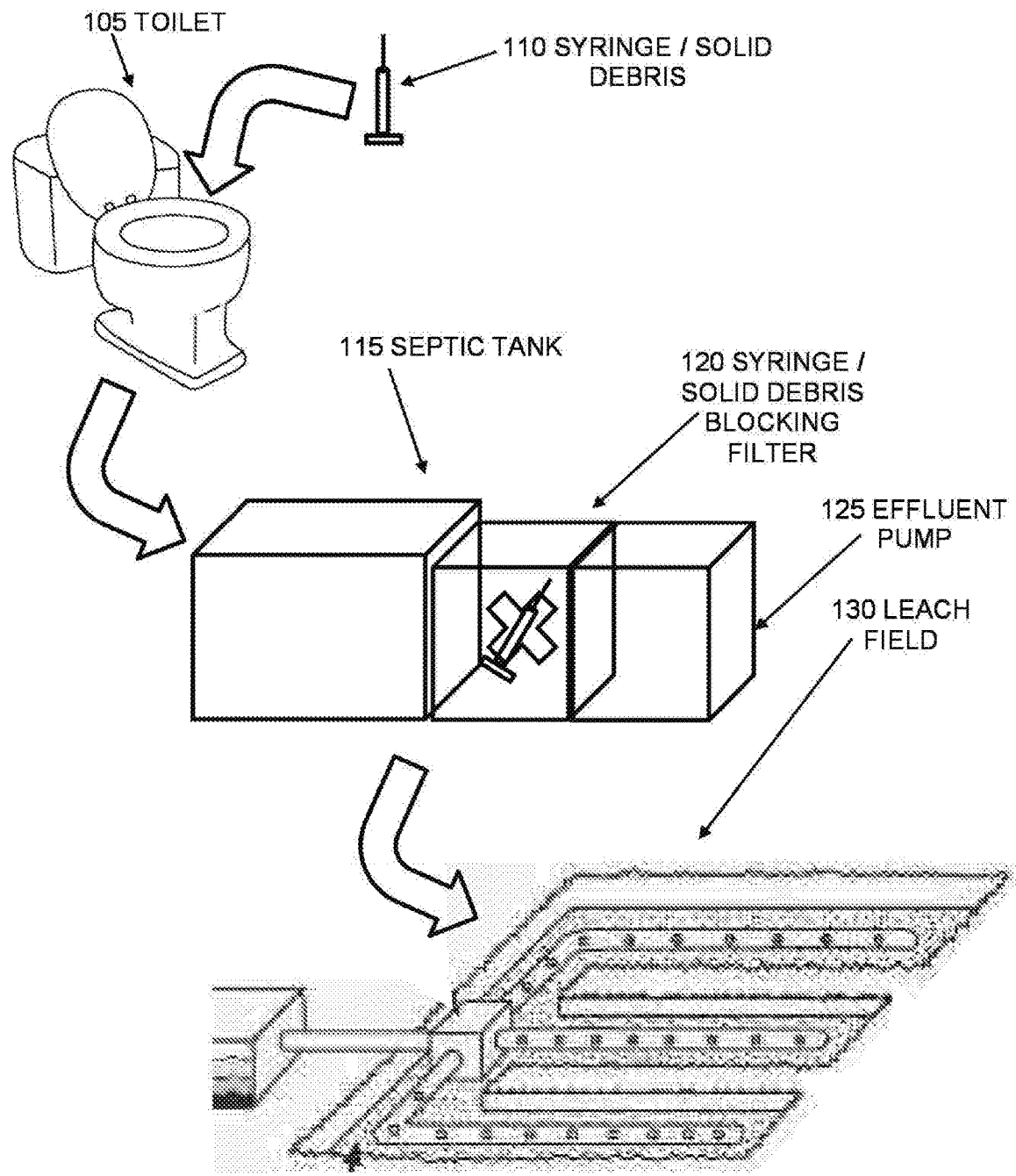
FIG. 1 depicts a simplified environment for a filter configured in accordance with one embodiment of the invention.

Filter embodiments comprise septic tank effluent filters that keep plastics, gloves, syringes, feminine products and nonflushable items from entering, clogging and disabling sewage pump systems. As previously mentioned, cartridge-type effluent filters can cause an above-normal rise in the static water level in the septic tank, especially when they are ready for cleaning. Cartridge-type effluent filters inserted in the tank outlet T baffle may capture these items until the cartridge is pulled out for cleaning, however, at this point these items will rise up the outlet T baffle with the cartridge and pass into the pump chamber. There is no way to stop these items from surging into the pump chamber from an over-full septic tank. One plastic item or syringe can ruin a sewage ejector pump.

To overcome this problem, filter embodiments attach to the bottom of the septic tank outlet T baffle in either Schedule 35 or 40 pipe configurations. Embodiments can be retrofitted to existing T baffles or attached to new T baffles when they are placed into service. They are essentially non-clogging because each filter has 4.1 square feet of surface area and accepts effluent from the "clear zone" in the tank. Each filter is supplied with a cleaning basket that surrounds the filter and is lifted upwards to clean the outside surface of the filter of unwanted items. Pumping the septic tank is not required in order to clean this filter. The filter is visible at the tank outlet hatch opening, and extends slightly above the static water level down to a depth of 4 feet. Embodiments can be configured to fit ledge-tanks in a shorter version once the height to invert out is known.

Embodiments of the filter is constructed of either 4 or 6 in. diameter slotted Schedule 35 or 40 pipe sections each 2 feet long with a T fitting set midway between the slotted pipe ends. In embodiments, slots are ⅛ inch wide and are spaced ⅜ inch apart and run vertically up and down the pipe sections. The outlet end of the middle T fitting is connected to a street 90 elbow or regular elbow that is then glued to the lower end of the existing T baffle. For embodiments the top and bottom ends of the filter are fitted with perforated caps screwed to the slotted pipe ends with stainless steel screws to secure them. The top perforated cap extends above the surface water level just enough so that it could be removed to clean the inside of the filter if necessary, without removing the filter. It would normally not be necessary to remove the top end cap for cleaning in most installations. No unwanted items can enter this filter while in service or when the upper end cap is removed for cleaning because it extends above the surface water level of the tank.

In embodiments, the cleaning basket strainer consists of a U-shaped, slotted plastic mesh with ¼ inch slots or holes throughout. For embodiments, the basket strainer is 2 inches wider than the filter's diameter. The rim of the cleaning basket strainer extends upward from the bottom surface of the basket for 4 inches. In embodiments, a ½ inch diameter, female plastic pipefitting is attached to the inside edge of the basket on the side opposite from the slot opening to secure a plastic pipe handle for lifting. The basket strainer has a 4 in. diameter hole centered that will fit around the bottom of the filter enabling the basket to be lifted upward to sweep debris from the outer surface of the entire length of the filter to clean it while the tank is not over-full, at its normal operating level. Embodiments of the lifting handle are built of ½ inch diameter plastic pipe cut-to-length to reach the bottom of the filter and glued to the female pipefitting on the inside edge of the basket.

FIG. 1 depicts a simplified environment 100 for a filter. Environment components comprise a toilet 105 into which impermissible solid debris such as syringes 110 are placed; septic tank 115 into which toilet 105 is discharged; filter 120 preventing solid debris such as syringes 110 from proceeding into either effluent pump 125 or leach field 130.

Figure 2:
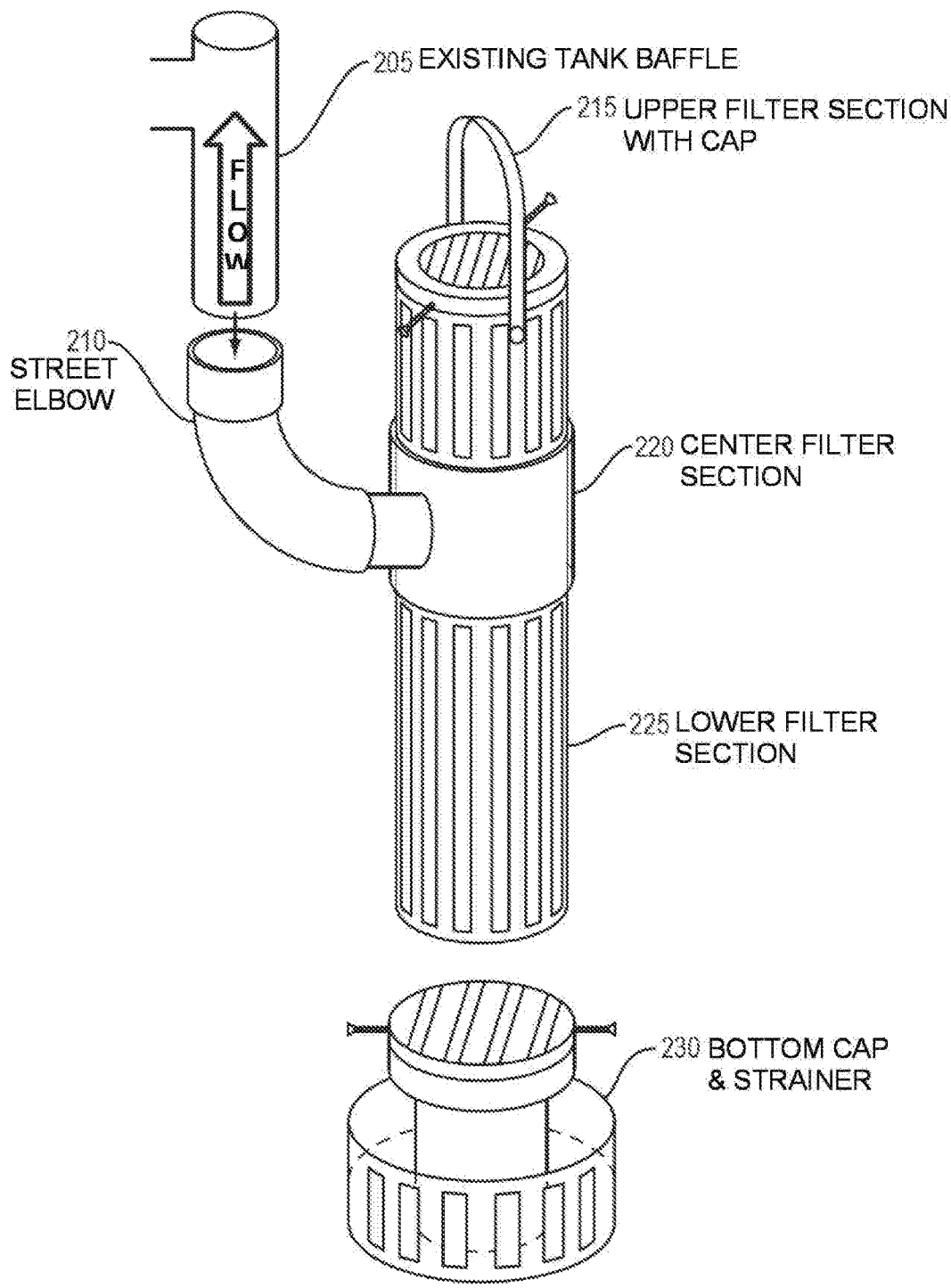
FIG. 2 is a composite portrayal of a first filter configured in accordance with embodiments of the invention.

FIG. 2 is a composite portrayal 200 of a first filter embodiment. Components comprise existing tank baffle 205; street elbow 210; upper filter section with cap 215; center filter section 220; lower filter section 225; and bottom cap and strainer 230. The top of the upper filter casing section 215 must extend above the static water level.

Figure 3:
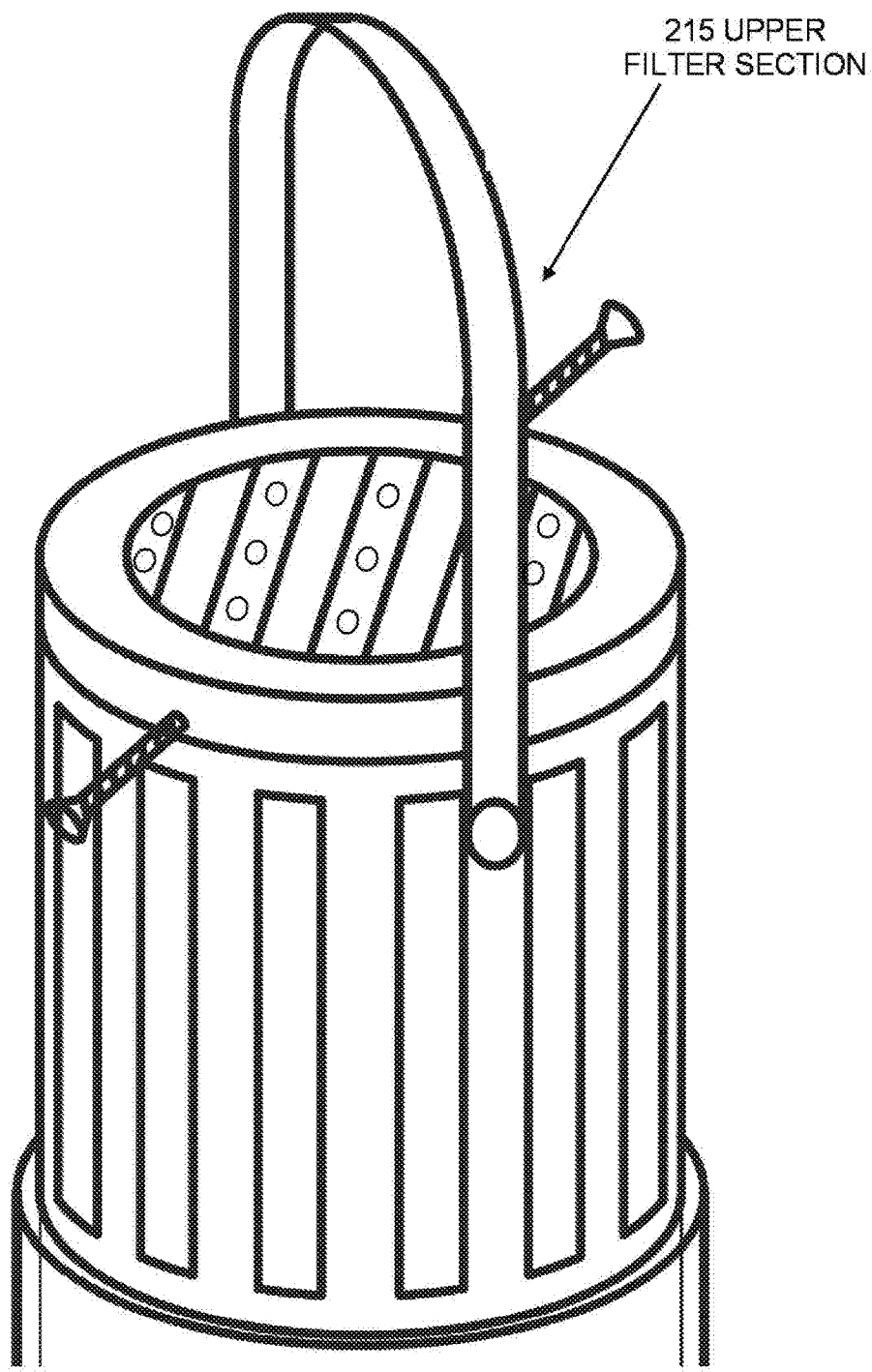
FIG. 3 is a portrayal of filter component details configured in accordance with embodiments of the invention.

FIG. 3 is a detail 300 of filter components. Filter components comprise upper filter section 215. In embodiments, upper filter section 215 comprises a removable slit-top cap, a lift handle, and stainless steel screws. An identical end cap is attached to the lower end of the filter. Embodiments include ⅛ inch vertical saw kerf cuts or ¼ inch diameter holes. The top of the upper filter casing section 215 must extend above the static water level.

Figure 4:
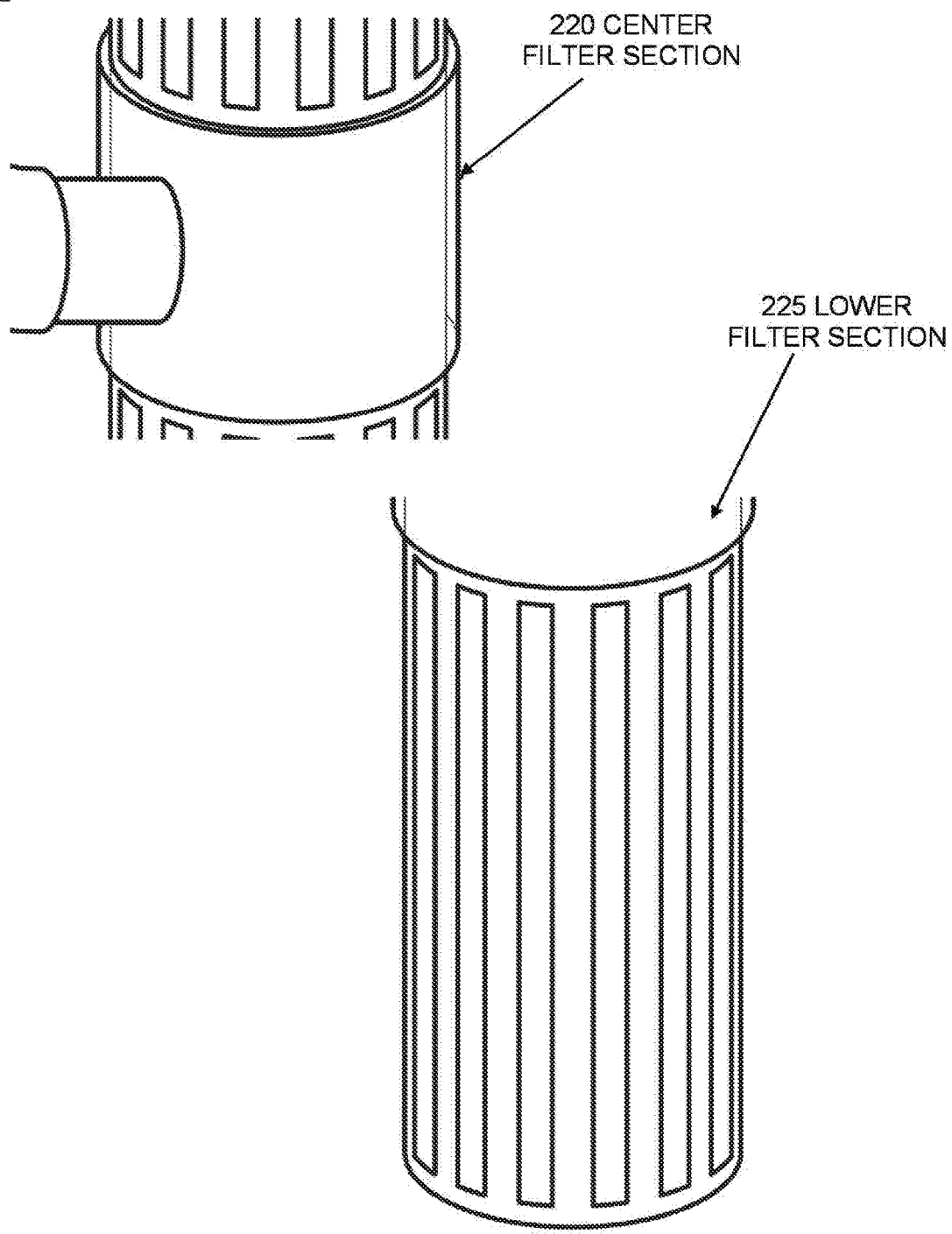
FIG. 4 is a portrayal of filter component details configured in accordance with embodiments of the invention.

FIG. 4 is a detail 400 of filter components. Filter components comprise center filter section 220 and lower filter section 225. In embodiments, center filter section 220 comprises a 4 or 6 inch diameter T-fitting. In other embodiments, center section 220, upper section 215, and lower section 225 are from a single piece of 4 or 6 inch diameter schedule 35 or 40 pipe, having a 4 or 6 inch diameter hole cut in the middle for street elbow insertion. Lower filter section 225 includes ⅛ inch vertical saw kerf cuts and its perforated end cap.

Figure 5:
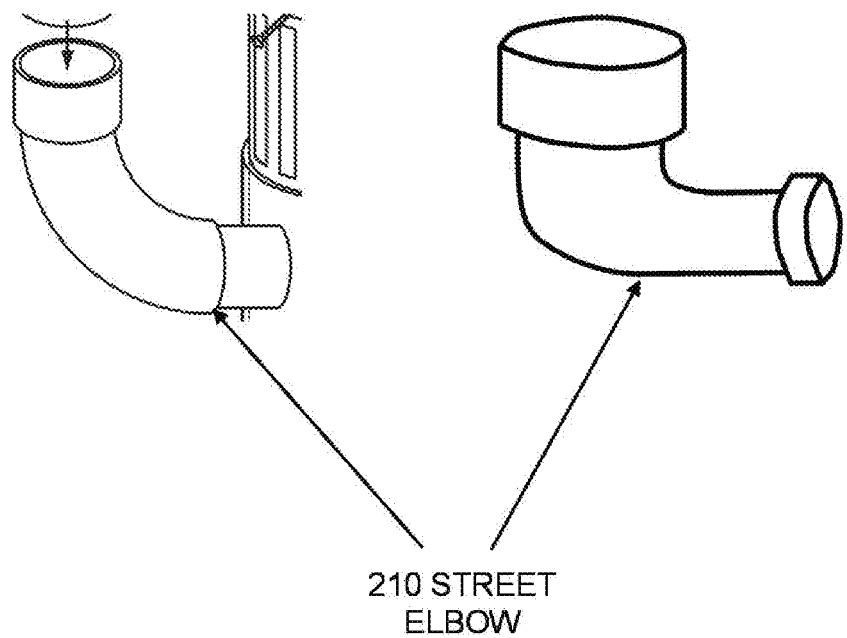
FIG. 5 is a portrayal of filter component details configured in accordance with embodiments of the invention.
Figure 5:
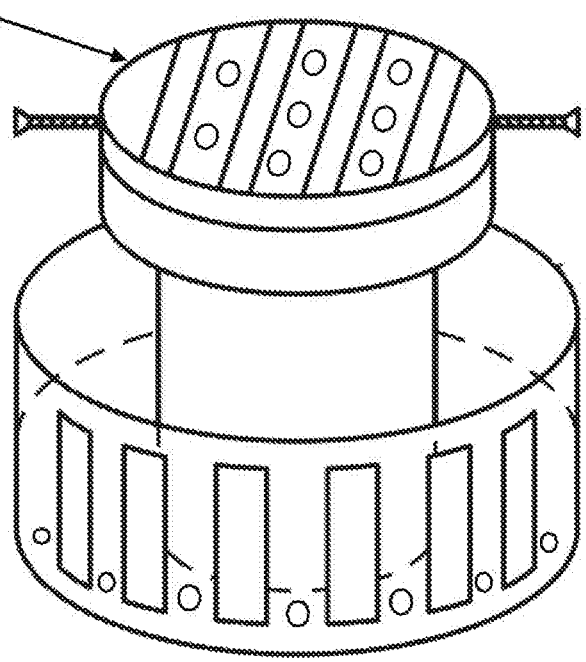

FIG. 5 is a detail 500 of filter components. Filter components comprise street elbow 210 and bottom cap and strainer 230. In embodiments, street elbow 210 is affixed to output of an existing 16" tank baffle of schedule 35 or 40. For embodiments, street elbow 210 is 4 to 6 inches in diameter and schedule 35 or 40. Embodiments comprise a T-fitting as the center section 220 (and 620). Bottom cap and strainer 230, in embodiments, comprises a screw on cap and a liftable cleaning strainer.

Figure 6:
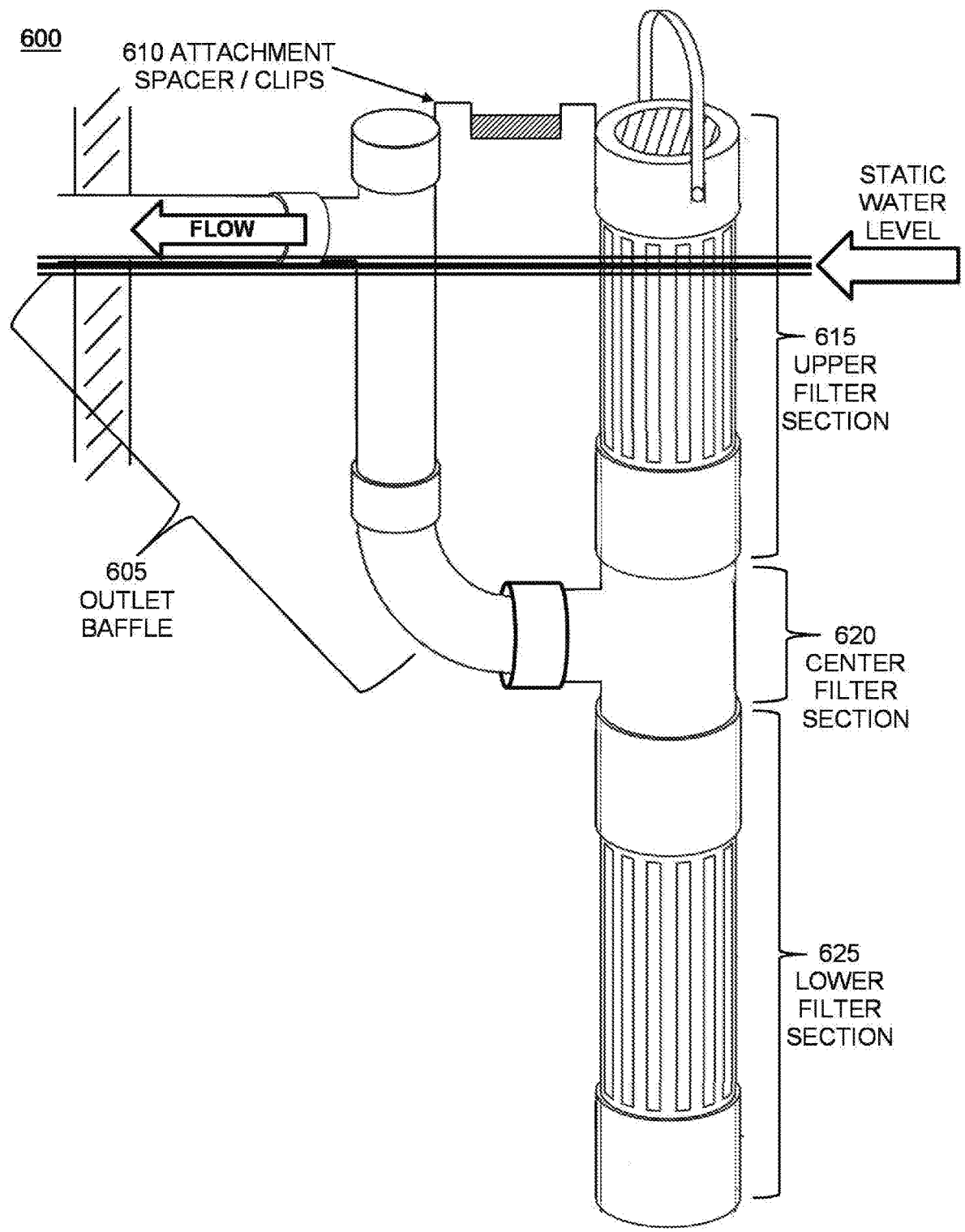
FIG. 6 is a composite portrayal of a second filter configured in accordance with embodiments of the invention.

FIG. 6 is a composite portrayal 600 of a second filter embodiment. Components comprise outlet baffle 605; attachment/spacer/clips 610; upper filter section 615; center filter section 620; and lower filter section 625.

Figure 7:
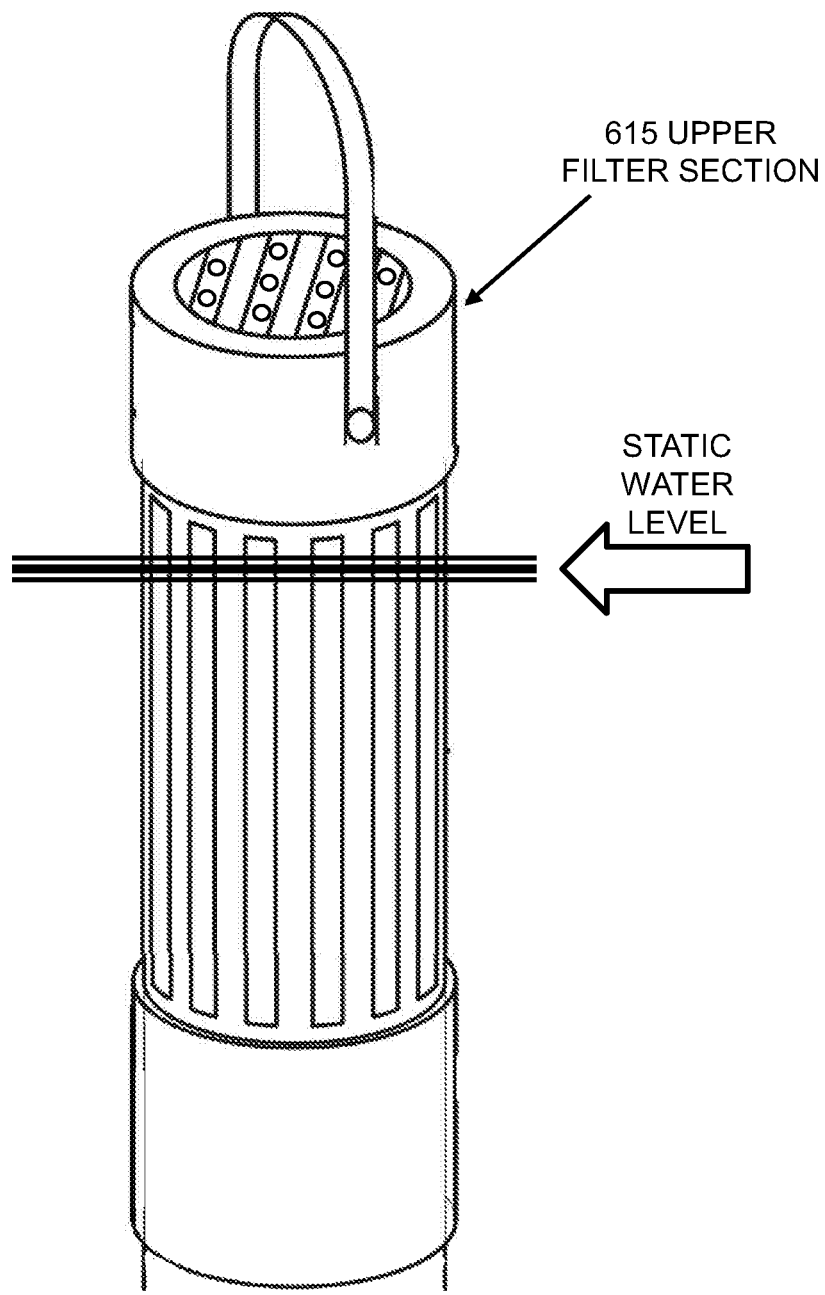
FIG. 7 is a portrayal of filter component details configured in accordance with embodiments of the invention.

FIG. 7 is a detail 700 of filter components. Filter components comprise upper filter section 615. In embodiments, upper filter section 615 comprises a lift handle and perforated cap. Embodiments include ⅛ inch vertical saw kerf cuts or ¼ inch diameter holes. The top of the upper filter casing section 615 must extend above the static water level.

Figure 8:
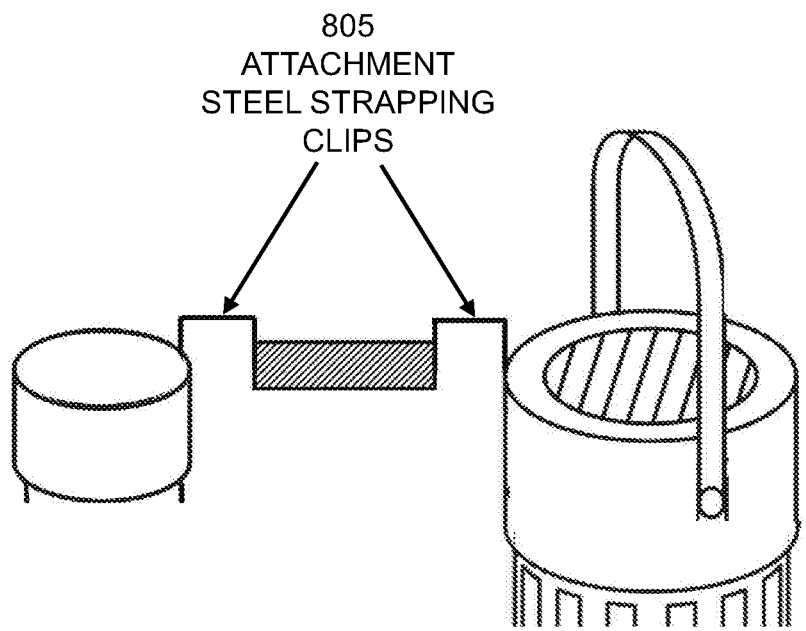
FIG. 8 is a portrayal of filter component details configured in accordance with embodiments of the invention.
Figure 8:
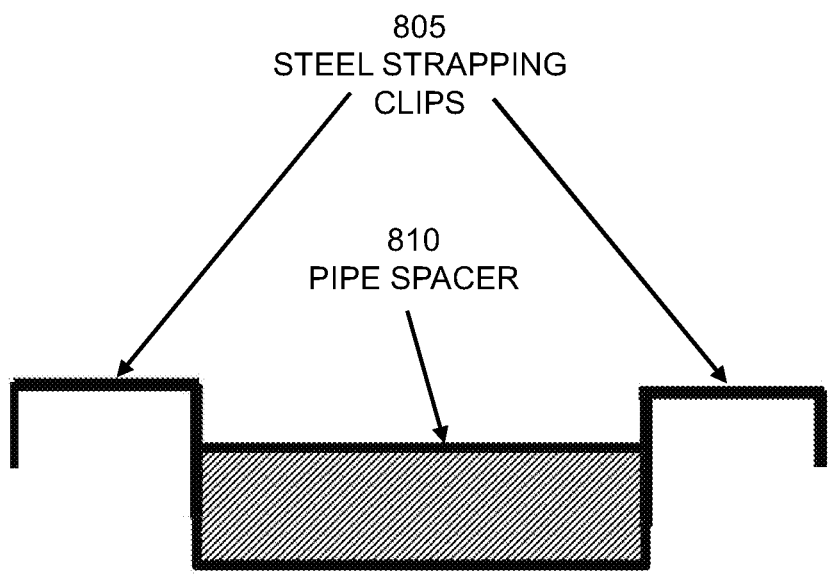

FIG. 8 is a detail 800 of filter components. Filter components comprise plastic spacer of ½ inch diameter PVC pipe/clip 610 with attachment clips of steel strapping 805 and spacer 810 details shown. The clips keep the filter upright and attached to the baffle.

Figure 9:
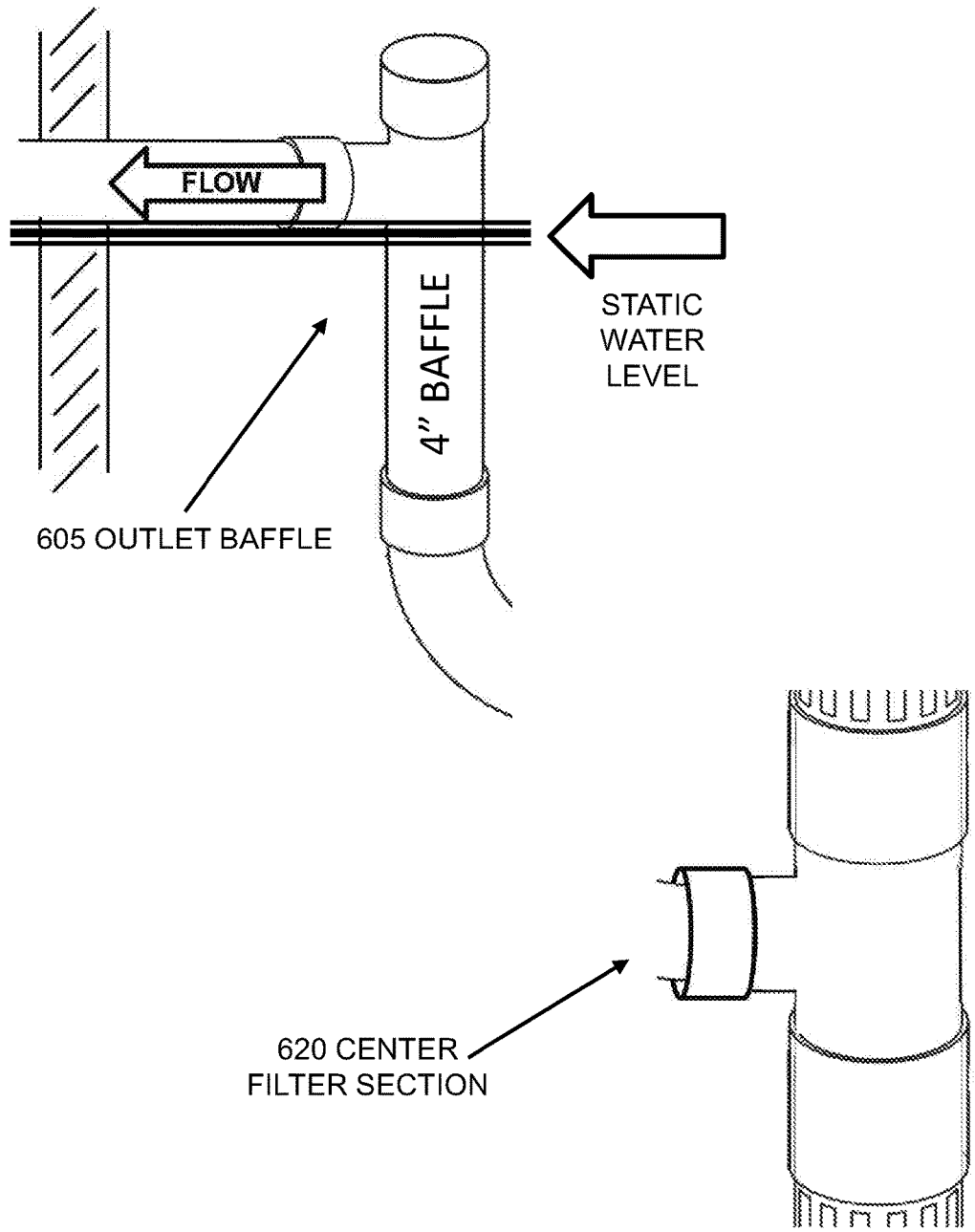
FIG. 9 is a portrayal of filter component details configured in accordance with embodiments of the invention.

FIG. 9 is a detail 900 of filter components. Filter components comprise outlet baffle 605 and center filter section 620. In embodiments, the baffle is 4 or 6 inches in diameter.

Figure 10:
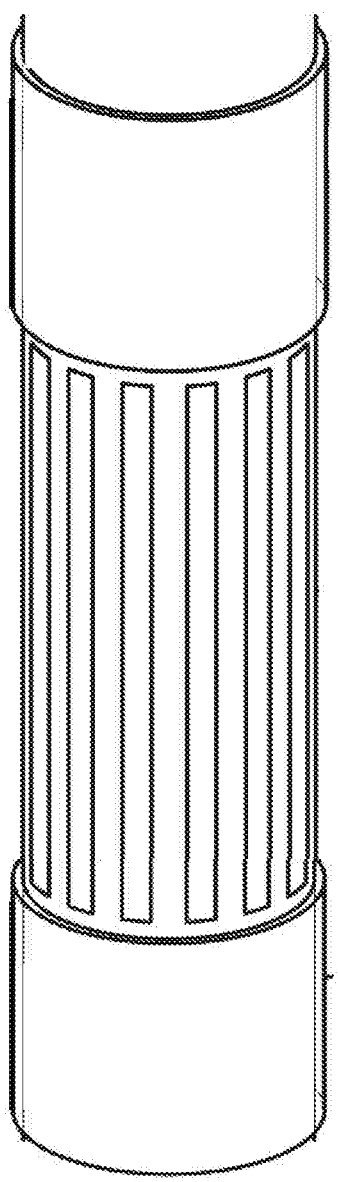
FIG. 10 is a portrayal of filter component details configured in accordance with embodiments of the invention.
Figure 10:
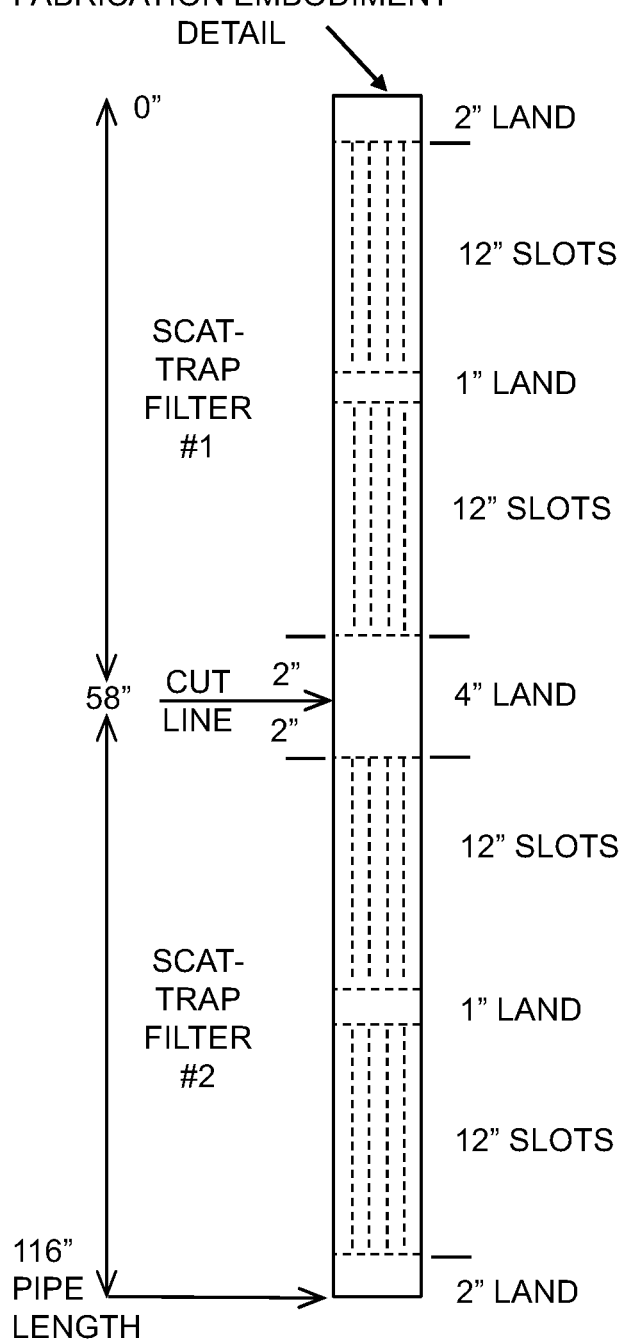

FIG. 10 is a detail 1000 of filter components. Filter components comprise lower filter section 625. In embodiments, lower section 625 is from 4 or 6 inch diameter schedule 35 or 40 pipe, having ⅛ inch vertical saw kerf cuts with a height of 24 inches to 48 inches to the T-fitting. Embodiments include a slotted bottom cap or a cap with ¼ inch diameter drill holes. For fabrication embodiments, an overall length of 116 inches is cut into two 58 inch sections with a cut line, resulting in a filter #1 and a filter #2. Sequentially, the length comprises—from the "top", a 2 inch land section, a 12 inch slots section, a 1 inch land, a 12 inch slots section, a 4 inch land section (two 2 inch lands either side of the cut line), a 12 inch slots section, a 1 inch land, a 12 inch slots section, and a 2 inch land section.

Figure 11:
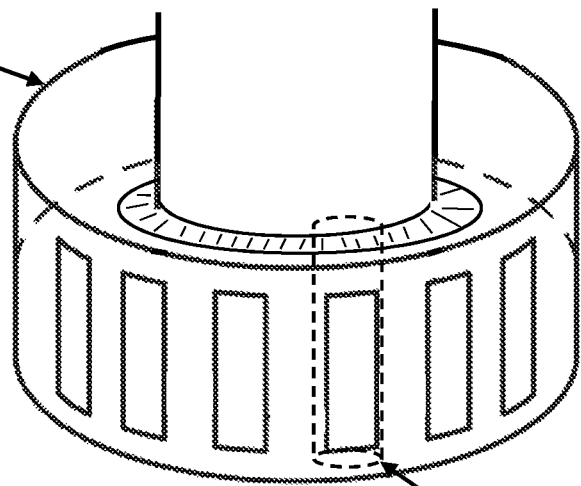
FIG. 11 is a portrayal of filter component details configured in accordance with embodiments of the invention.
Figure 11:
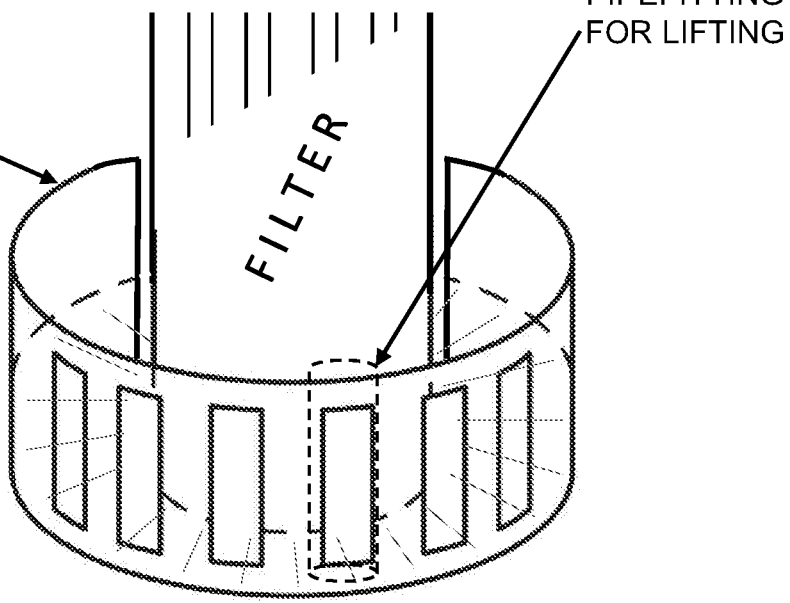

FIG. 11 is a detail 1100 of filter components. Filter components comprise cleaning strainer view one 1105 and cleaning strainer view two 1110. In embodiments, the cleaning strainer has an open back for easy removal. The cleaning strainer is liftable for cleaning the filter. A ½ inch diameter pipefitting is attached to the inside of the basket for lifting. In embodiments, the cleaning strainer is 8 inches in diameter as a slide cap basket. Embodiments are about 4 inches high and have ⅛ inch kerf cut spacing for cleaning.

Figure 12:
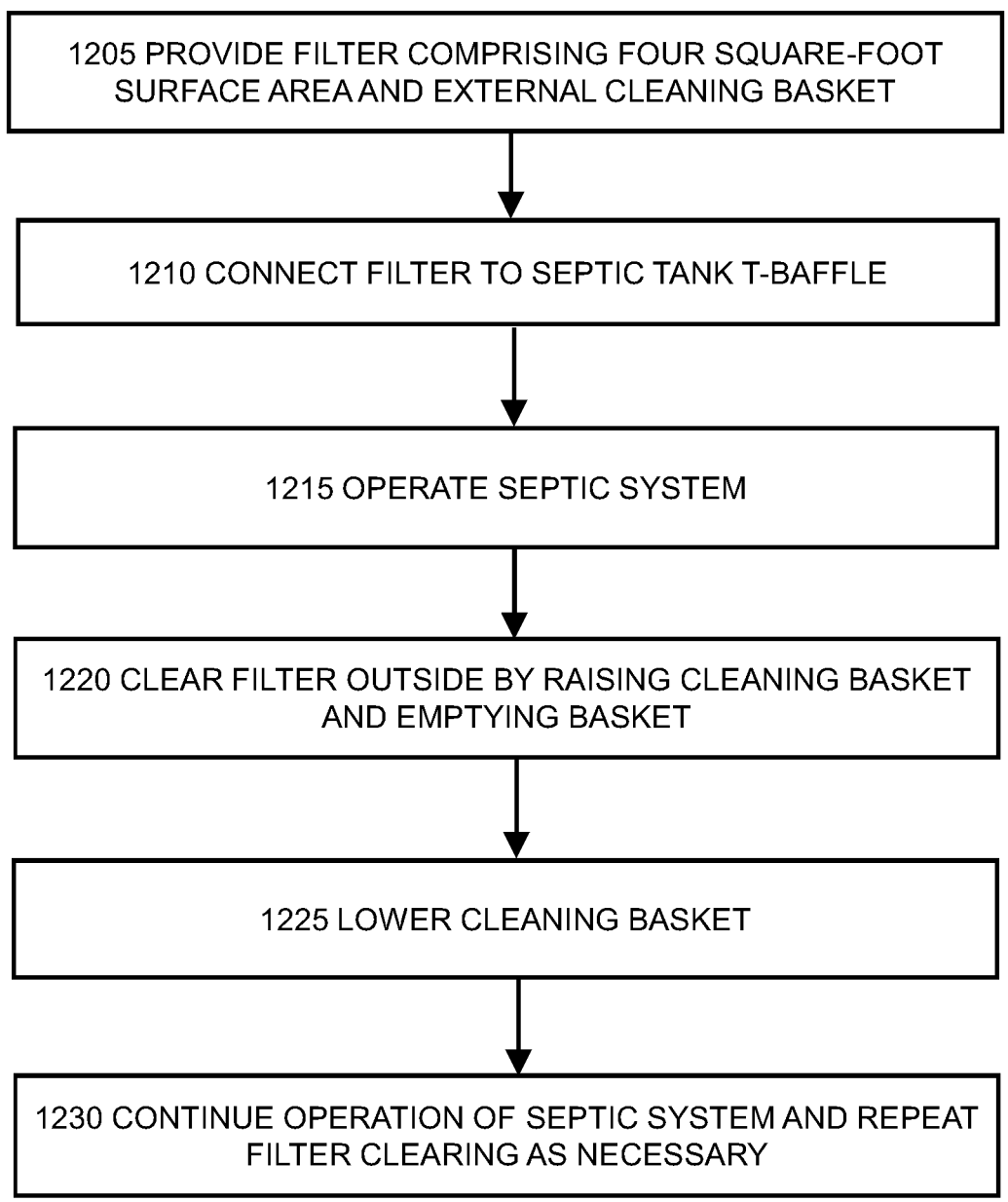
FIG. 12 is a filter method configured in accordance with embodiments of the invention.

FIG. 12 is a flow chart for filter method 1200. Steps comprise providing a filter comprising about a four square-foot surface area and external cleaning basket 1205; connecting the filter to a septic tank T-baffle 1210; operating the septic system 1215; clearing the filter outside by raising the cleaning basket and emptying the basket 1220; lowering the cleaning basket 1225; and continuing operation of the septic system and repeating filter clearing as necessary 1230.

Aerator

A first aerator embodiment comprises an 8 to 12 inch diameter schedule 35 PVC pipe 4 feet to 6 feet in height, tailor-fit to match tank invert height at the outlet end of the septic tank. The large diameter PVC aerator pipe has two ¾ inch diameter inlet holes at its bottom end to allow effluent into the aeration chamber. Each ¾" diameter inlet hole has a pipe elbow affixed to it on the outside of the aerator pipe with a vertical 15 inch long PVC standpipe attached to it to take effluent from the clear zone in the septic tank, sending it through the aerator for treatment. Each ¾ inch diameter inlet hole has a ¾ inch diameter "T" fitting affixed to its inside flange oriented vertically in the large diameter PVC aerator pipe.

Embodiment air inlet piping is ½" diameter PVC conduit pipe attached to a "T" shaped air diffuser within the large-diameter aerator pipe at its lowest level. The air diffuser produces small and large sized air bubbles which travel upward through fixed-film plastic media upon which facultative aerobic bacteria grow. The movement of air through the diffuser causes a weak water current to flow upward into the growth media to circulate untreated effluent through the aerator unit from bottom to top. In embodiments, the large diameter aerator pipe is open at its lower end. In embodiments, the aerator pipe itself rests vertically on the floor of the septic tank. In embodiments, the top end is open. In embodiments, the final height of the aerator is field adjusted to a specific height approximately 2 inches below the static water level. For embodiments, a series of ¼" diameter holes are drilled in three concentric rows in the upper sidewalls of the aerator just below the top to let air bubbles out sideways.

At its top end, embodiments of the aerator have an 8 inch long, slotted, sliding PVC pipe collar the same diameter as the aerator pipe itself. This is called an anti-turbulation collar. This sliding collar is slit down one side from its top edge to its bottom edge to allow it to stretch-fit over the main aerator pipe and grip it for a variable height adjustment depending on the static water level in the septic tank. In embodiments, the sliding collar has ⅛th inch wide, vertical saw kerf cuts/slots cut in at ¾" intervals around its circumference to allow for treated water passage through the kerf cuts. In embodiments, the saw kerf cuts are 4 inches long and do not extend more than halfway down from the top edge of the anti-turbulation collar. Slots are cut down to within 4 inches of the bottom edge of the collar, leaving the bottom collar edge intact. Slots in the sliding collar retard bubble-action through the collar to minimize tank turbulence over the water surface, yet still allow air foam to pass over the top edge and quietly dissipate. Importantly, it results in no disturbance to the scum layer of the septic tank. The sliding anti-turbulation collar is height-adjusted after the aerator is put into service so that its slotted top edge is about 1 to 2 inches above the static water level in the septic tank.

In embodiments, treatment media is a fixed-film PVC plastic mesh fabric with 2" diameter holes cut into it at ½" intervals. Growth media film is loosely wrapped around the vertical air inlet pipe and affixed to it at 12 inch intervals by stainless steel screws. The length of growth media film within the aerator varies depending upon the outside diameter of the aerator pipe itself. It extends down from the top of the large diameter aerator pipe to the air diffuser, and extends to within 1 or 2 inches of the top of the aerator pipe. Growth media fabric is wrapped loosely around the vertical air inlet conduit pipe to allow effluent and air to flow freely over the surface of the growth media fabric where it comes into contact with facultative aerobic bacteria which provide treatment. Facultative aerobic bacteria will colonize the fabric over time to reduce TSS, BOD, coliform, and anaerobic bacteria levels in the tank as long as the air supply is continuous.

In embodiments, air is supplied to the aerator unit via a Medo LA-120 air pump, or equal, which feeds air through ½ inch diameter PVC flexible or rigid electrical conduit tubing capable of being solvent welded to the same air supply pipe within the aerator itself. Air supply conduit tubing passes through the septic tank wall or tank roof and is either grouted or cemented to seal the pipe penetration through the tank itself. Air supply conduit tubing will have a negative pipe slope toward the septic tank and shall be sealed at the house foundation with foam or hydraulic cement to seal the foundation against groundwater entry into the basement. Air supply conduit shall be installed through the septic tank wall or roof at its outlet end whenever possible so that the aerator can be located at the outlet end of the septic tank also. In embodiments, the last 2 foot section of ½ inch diameter air supply pipe is flexible PVC pipe within the tank itself to allow for proper centering and placement of the aerator. For embodiments, the air pump is installed in the basement, or is accessible in a buried vented outdoor vault to verify that it is running continuously, and it is wired to a non-GFI circuit.

For embodiments, the "T" shaped air diffuser is located at the bottom of the aerator unit. In embodiments, the air diffuser itself is an inverted "T" shaped piece of ½ inch PVC electrical conduit with many 1/16 inch and ⅛ inch diameter holes drilled in it. It is solvent welded to the same ½" diameter solid PVC pipe running vertically out the top of the aerator unit. In embodiments, the legs of the air diffuser extend sideways to the outside walls of the aerator having their ends capped. For embodiments, the air diffuser is centered in the aerator. Air is continuously fed through the diffuser, creating a steady, torrential, bubble stream over the entire surface of the bacterial growth media fabric.

Figure 13:
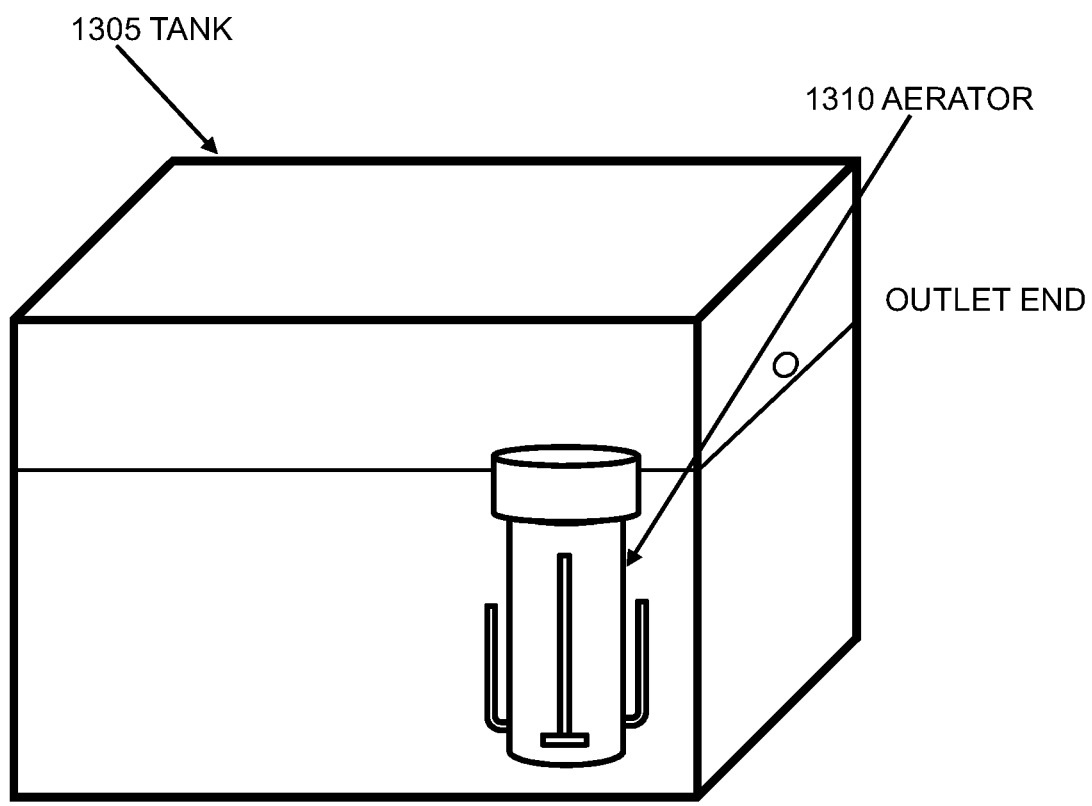
FIG. 13 depicts a simplified environment for an aerator configured in accordance with one embodiment of the invention.

FIG. 13 depicts a simplified environment 1300 for an aerator. Components comprise tank 1305 and aerator 1310.

Figure 14:
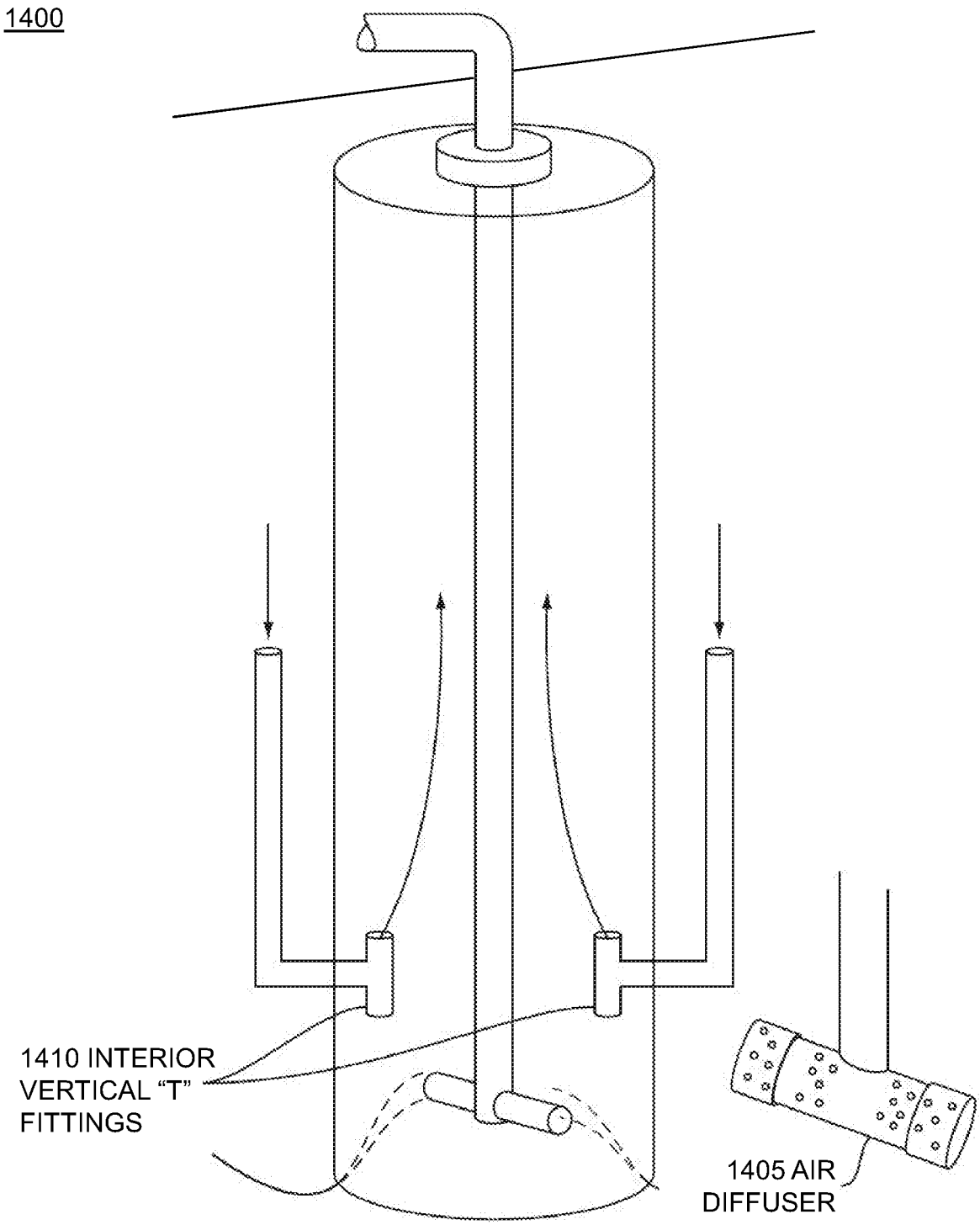
FIG. 14 is a composite portrayal of an aerator configured in accordance with embodiments of the invention.

FIG. 14 is a composite portrayal 1400 of an aerator embodiment. Air in through the top blows through fine-bore holes in the T-shaped air diffuser 1405 to produce fine bubbles. The T-shaped air diffuser comprises interior vertical "T" fittings 1410. The surface area of the holes comprising the diffuser head must be less than or equal to 80% of the inside area of the vertical air supply pipe.

Figure 15:
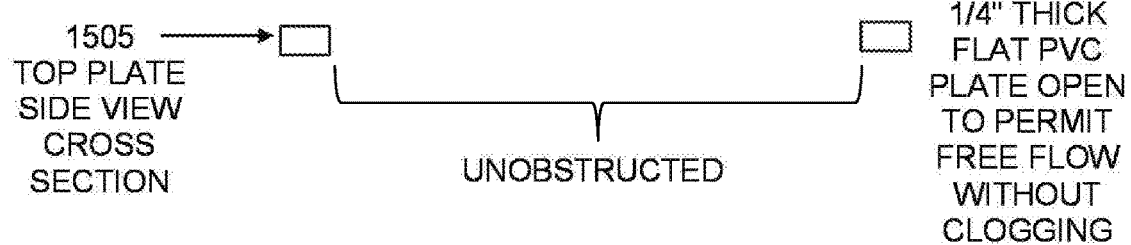
FIG. 15 is a portrayal of aerator component details configured in accordance with embodiments of the invention.
Figure 15:
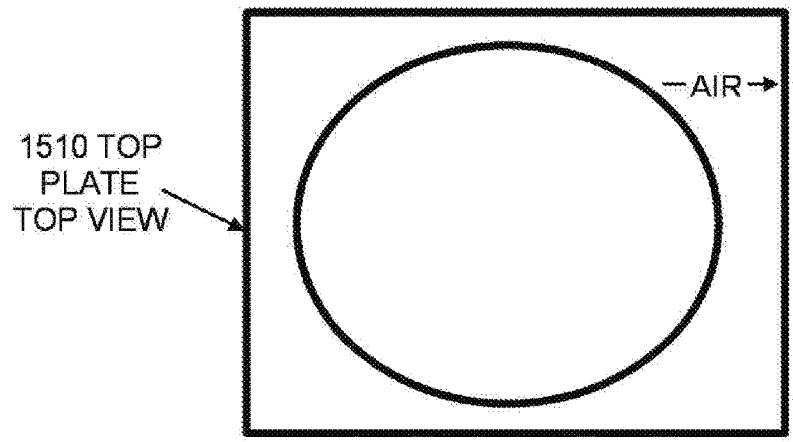
Figure 15:
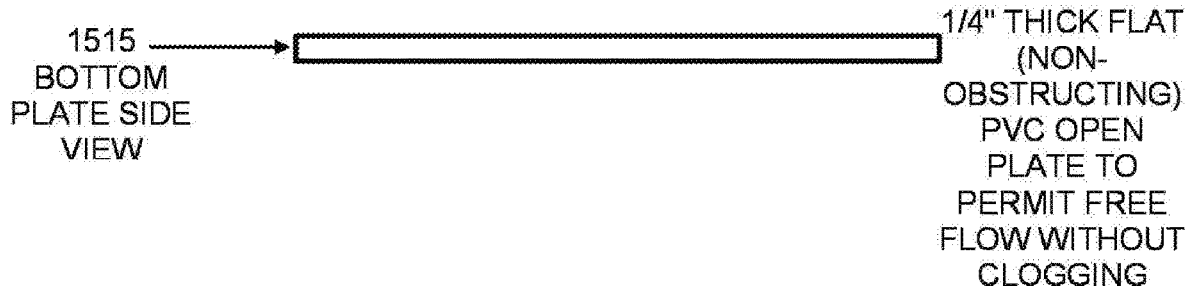

FIG. 15 is a detail 1500 of aerator components. Components comprise open top and bottom plates. The top plate side view 1505 depicts a non-obstructing opening which, in embodiments, results from omitting the top and bottom plates. The top view 1510 depicts the non-obstructing opening. The bottom plate side view 1515 depicts an also non-obstructing-opening ¼ inch thick PVC plate to be solvent welded to the aerator bottom.

Figure 16:
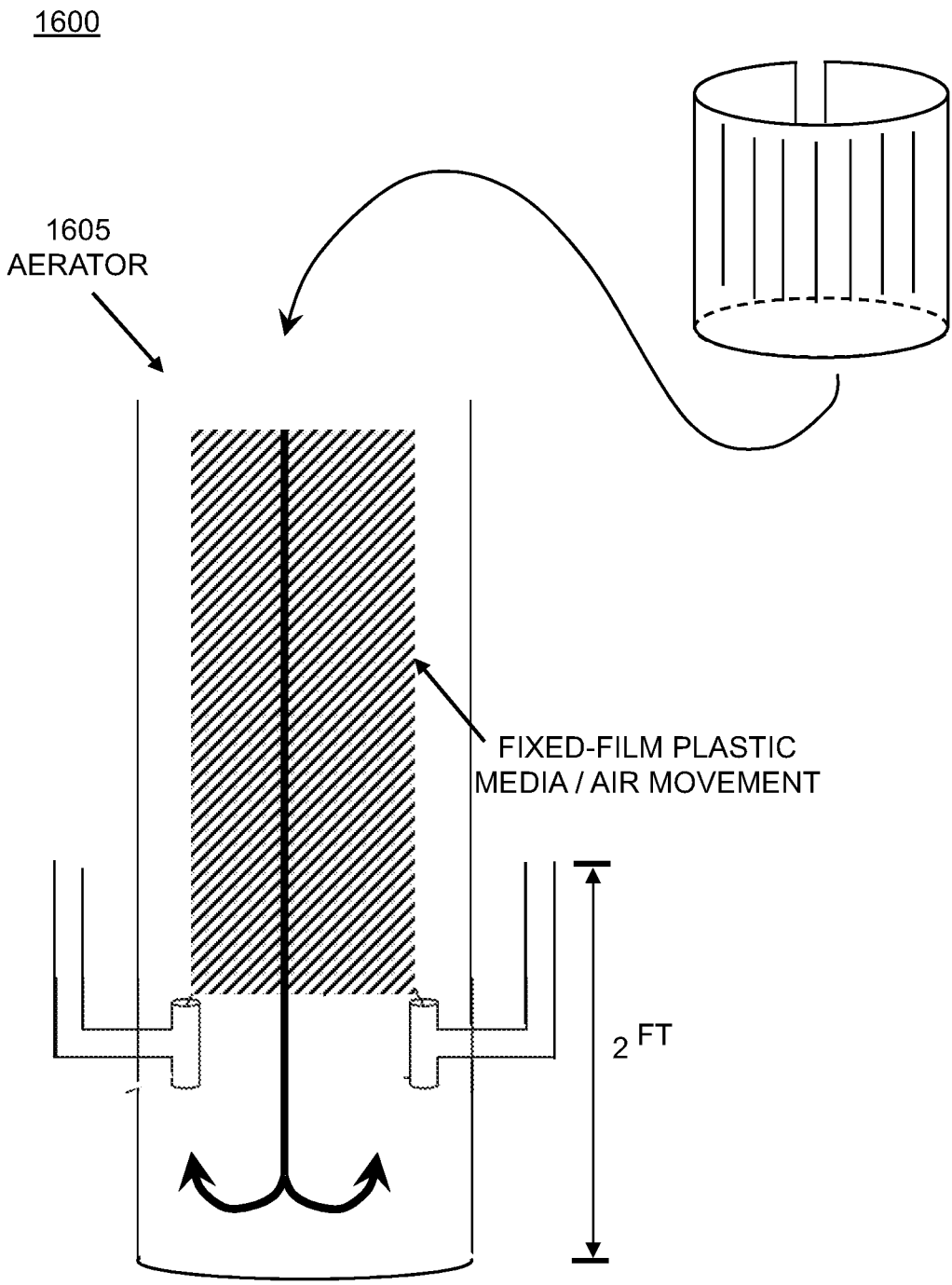
FIG. 16 is a portrayal of aerator component details configured in accordance with embodiments.

FIG. 16 is a detail 1600 of aerator 1605 components including anti-turbulation collar.

Figure 17:
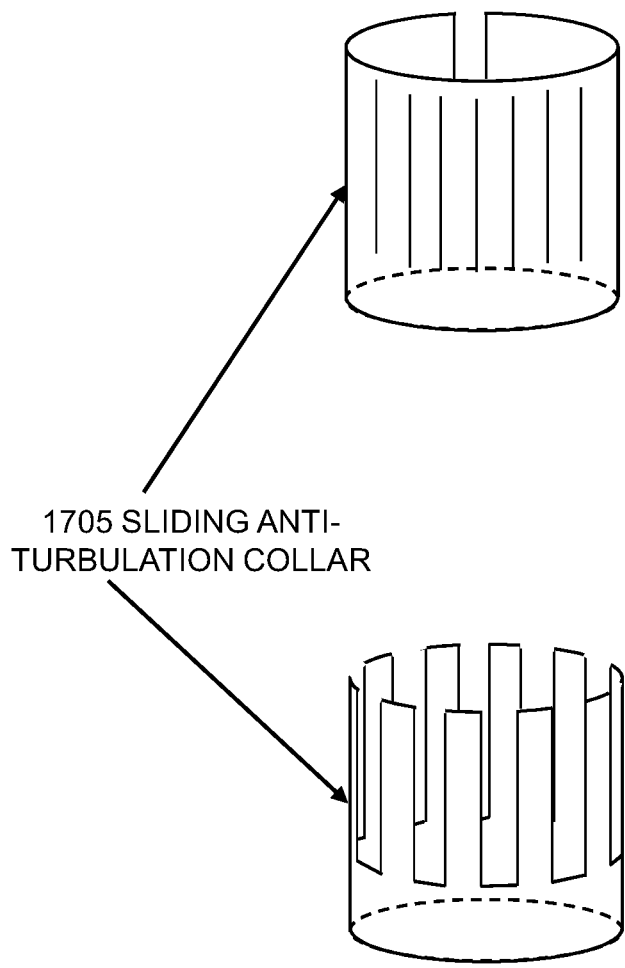
FIG. 17 is a portrayal of aerator sliding collar component details configured in accordance with embodiments.

FIG. 17 is a detail 1700 of aerator components. Components comprise an adjustable sliding anti-turbulation collar 1705 to prevent turbulence on top surface. Embodiments comprise an open flex seam and saw kerf slots as previously described for the slotted, sliding, PVC pipe collar.

Figure 18:
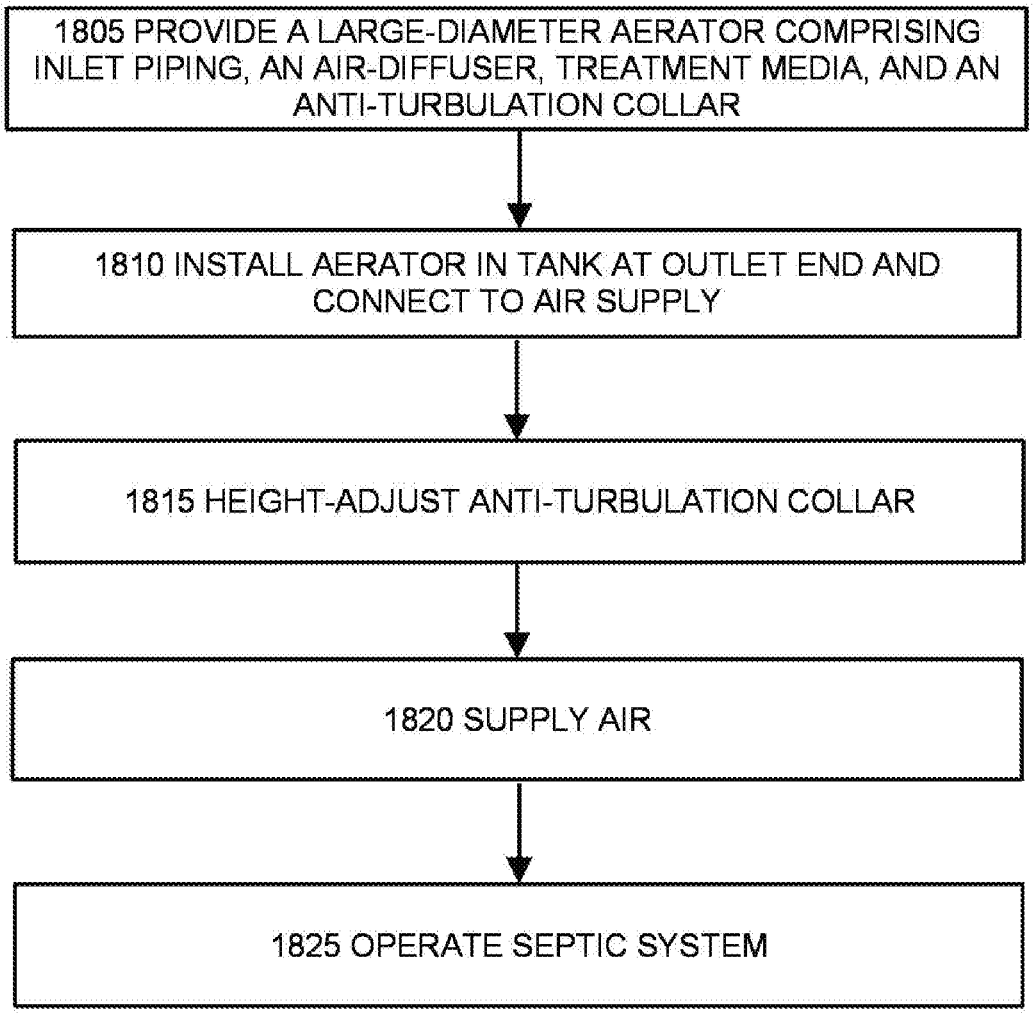
FIG. 18 is an aerator method configured in accordance with embodiments of the invention.

FIG. 18 is a flow chart for an aerator method 1800. Steps comprise providing a large-diameter aerator comprising inlet piping, an air-diffuser, treatment media, and an anti-turbulation collar 1805; installing the aerator in a tank at the outlet end and connecting to the air supply 1810; height-adjusting the anti-turbulation collar 1815; supplying air 1820; and operating the septic system 1825.

The foregoing description of the embodiments of the invention has been presented for the purposes of illustration and description. It is not intended to be exhaustive or to limit the invention to the precise form disclosed. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure. Other and various embodiments will be readily apparent to those skilled in the art, from this description, figures, and the claims that follow. It is intended that the scope of the invention be limited not by this detailed description, but rather by the claims appended hereto.

What is claimed is:

1. A septic tank effluent treatment system comprising:
   a filter comprising:
      an upper section (215);
      a center section (220);
      a lower section (225) connecting said upper section and said lower section;
      attachments (805) for locating said filter;
      a spacer (810) to align said upper section; and
      a liftable cleaning strainer (230, 1105, 1110);
      wherein said strainer removes solid debris from said filter for removal without allowing the solid debris to pass;
      wherein said upper and lower sections comprise kerf slots; and
      wherein said center section connects to a tank baffle.

2. The septic tank effluent treatment system of claim 1 further comprising:
   an aerator (1310, 1605) comprising:
      a large-diameter-to-length ratio aerator pipe;
      inlet piping to said aerator pipe;
      an air-diffuser (1405) within said aerator pipe;
      treatment media within said aerator pipe; and
      an anti-turbulation collar (1705).

3. The septic tank effluent treatment system of claim 1 wherein dimensions of said filter comprise:
   an 8 inch diameter of said liftable cleaning strainer slide cap basket, 4 inches high with ⅛ inch kerf cut spacing for cleaning;
   a ½ inch diameter strainer lifting pipefitting;
   said lower section comprising an upper 2 inch land section, a 12 inch slots section, a 1 inch land, a 12 inch slots section, and a 2 lower inch land section (625); and
   a 4 inch diameter of said tank baffle.

4. The system of claim 2 wherein dimensions of said aerator comprise:
   a diameter of said aerator pipe of 8 to 12 inches;
   a length of said aerator pipe of 4 to 6 feet;
   ¾ inch diameter inlet holes in said aerator pipe;
   a ½ inch diameter fitting of said air diffuser; and
   an 8 inch length of said anti-turbulation collar.

5. The septic tank effluent treatment system of claim 1 wherein a cap of said filter extends above a static liquid level said filter extending down to a depth of 4 feet.

6. The septic tank effluent treatment system of claim 1 wherein said filter comprises:
   an outlet end a T fitting of said center section connected to a street 90 elbow or a standard elbow affixed to a lower end of an existing said T baffle.

7. The septic tank effluent treatment system of claim 1 wherein said filter comprises:
   top and bottom ends fitted with perforated caps screwed to slotted pipe ends, wherein said top perforated cap extends above a surface liquid level just enough so that it is removable to clean an inside of said filter without removing said filter.

8. The septic tank effluent treatment system of claim 1 wherein said liftable cleaning strainer (230, 1105, 1110) of said filter comprises:
   a U-shaped, slotted plastic mesh with ¼ inch slots or holes throughout;
   wherein said liftable cleaning strainer is 2 inches wider than a diameter of said filter; and
   a rim of said liftable cleaning strainer extends upward from a bottom surface of said liftable cleaning strainer for 4 inches.

9. The septic tank effluent treatment system of claim 1 wherein said upper filter section (215, 615) comprises a removable slit-top cap comprising a lift handle.

10. The septic tank effluent treatment system of claim 2 wherein a surface area of holes comprising said diffuser of said aerator are less than or equal to 80% of an inside area of a vertical air supply pipe.

11. The septic tank effluent treatment system of claim 2 wherein said treatment media of said aerator comprises fixed-film plastic media upon which facultative aerobic bacteria grow.

12. The septic tank effluent treatment system of claim 2 wherein said treatment media of said aerator comprises a PVC plastic mesh fabric with 2 inch diameter holes cut into it at ½ inch intervals, said media extending down from a top of said aerator pipe to said air diffuser, and extending to within 1 or 2 inches of said top plate of said aerator.

13. The septic tank effluent treatment system of claim 2 wherein said anti-turbulation collar (1705, 1805) of said aerator is slidable and comprises an open flex seam and saw kerf slots.

14. The septic tank effluent treatment system of claim 2 wherein ends of said aerator are unobstructed.

15. A septic tank effluent treatment method comprising:
   providing a filter comprising about a four square-foot surface area and an external cleaning basket (1205);
   connecting said filter to a septic tank T-baffle (1210);
   operating a septic system (1215);
   clearing said filter outside by raising said cleaning basket and emptying said basket (1220);
   lowering said cleaning basket (1225); and
   continuing operation of said septic system and repeating filter clearing as necessary (1230).

16. The septic tank effluent treatment method of claim 15 further comprising:
   providing an aerator (1805) comprising an aerator pipe, inlet piping to said aerator pipe, an air-diffuser (1405) within said aerator pipe, treatment media within said aerator pipe, and an anti-turbulation collar (1705);
   installing said aerator in said septic tank at an outlet end and connecting to an air supply (1810);
   height-adjusting said anti-turbulation collar (1815);
   supplying air (1820); and
   operating said septic system (1825).

17. The septic tank effluent treatment method of claim 15 wherein said raising of said cleaning basket of said filter comprises lifting by a ½ inch diameter pipe having a length reaching a bottom of said filter and affixed to a female pipefitting on an inside edge of said cleaning basket.

18. The septic tank effluent treatment method of claim 16 wherein said step of installing said aerator comprises adjusting said anti-turbulation collar to said liquid level.

19. A septic tank effluent treatment device comprising:
   a filter comprising:
      an upper section (215);
      a center section (220);
      a lower section (225) connecting said upper section and said lower section;
      attachments (805) for locating said filter;
      a spacer (810) to align said upper section; and
      a liftable cleaning strainer (230, 1105, 1110).

20. The septic tank effluent treatment device of claim 19 further comprising:
   an aerator (1310, 1605) comprising:
      a large-diameter-to-length ratio aerator pipe;
      inlet piping to said aerator pipe;
      an air-diffuser (1405) within said aerator pipe;
      treatment media within said aerator pipe; and
      an anti-turbulation collar (1705).

* * * * *